Dec. 19, 1933. L. SUGERMAN Re. 19,029

TWIN SECTION EGG CARTON

Original Filed Dec. 30, 1926 4 Sheets-Sheet 1

Inventor:
Louis Sugerman,
By Banning & Banning
Attys.

Dec. 19, 1933. L. SUGERMAN Re. 19,029

TWIN SECTION EGG CARTON

Original Filed Dec. 30, 1926 4 Sheets-Sheet 2

Inventor:
Louis Sugerman,
By Bleuning & Bleuning
Attys.

Dec. 19, 1933. L. SUGERMAN Re. 19,029

TWIN SECTION EGG CARTON

Original Filed Dec. 30, 1926 4 Sheets-Sheet 3

Inventor:
Louis Sugerman,
By Banning & Banning
Attys.

Dec. 19, 1933. L. SUGERMAN Re. 19,029

TWIN SECTION EGG CARTON

Original Filed Dec. 30, 1926 4 Sheets-Sheet 4

Inventor:
Louis Sugerman,
By Banning & Banning
Attys.

Reissued Dec. 19, 1933

Re. 19,029

UNITED STATES PATENT OFFICE 19,029

TWIN-SECTION EGG CARTON

Louis Sugerman, Chicago, Ill., assignor to Leon Benoit, Chicago, Ill.

Original No. 1,793,026, dated February 17, 1931, Serial No. 157,888, December 30, 1926. Application for reissue February 25, 1933. Serial No. 658,564

21 Claims. (Cl. 229—29)

This invention appertains to cartons for eggs, and it is an object of this invention to produce an egg carton which shall be simple in construction, easy to assemble, and which shall hold eggs safely against breakage.

Another object of this invention is to provide a carton having a plurality of components, each of which is a unit complete in itself, adapted to be separated from the other components.

Another object of this invention is to provide an egg carton wherein spacing means is provided for keeping the eggs separated, said spacing means being integral with the material from which the carton is made.

It is a further object of this invention to provide a carton which, when empty, is collapsible to facilitate shipment thereof.

The attainment of these and further objects will be apparent from the accompanying specification taken in conjunction with the drawings forming a part thereof.

Referring to the drawings.

Figure 7:
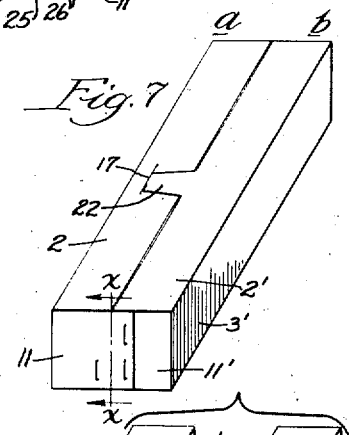
Figure 6:
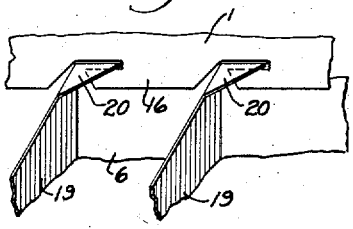
Figure 8:
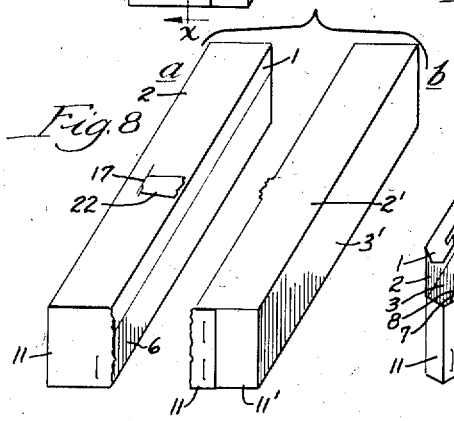
Figure 9:
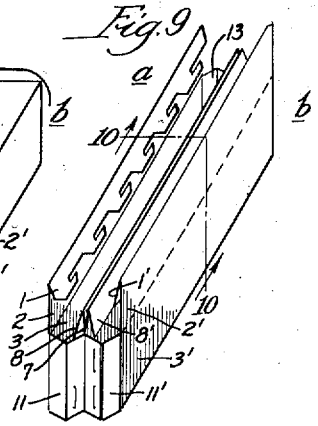
Figure 10:
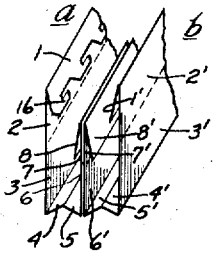
Figure 11:
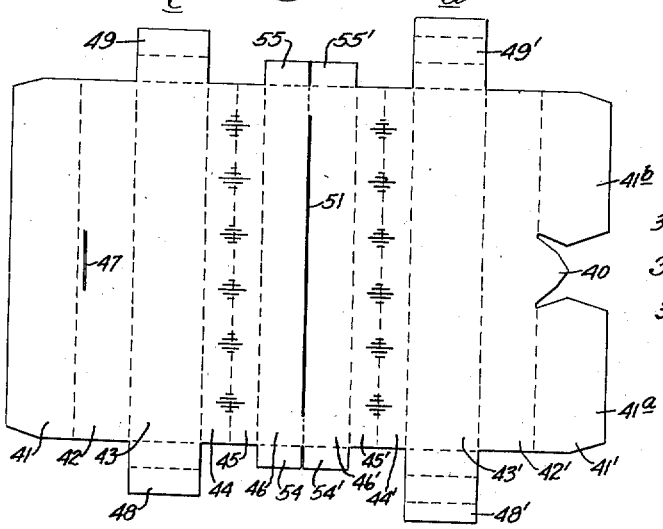
Figure 13:
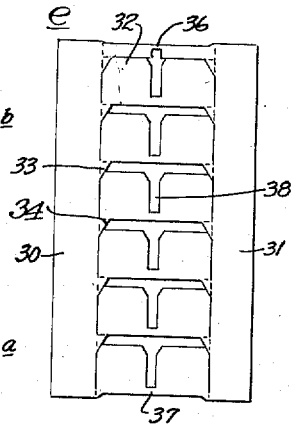
Figure 14:
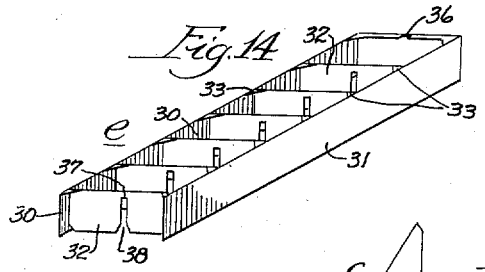
Figure 12:
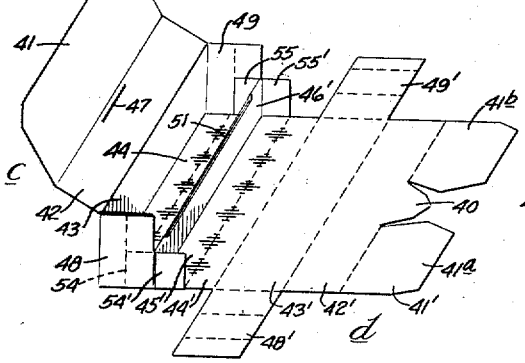
Figure 15:
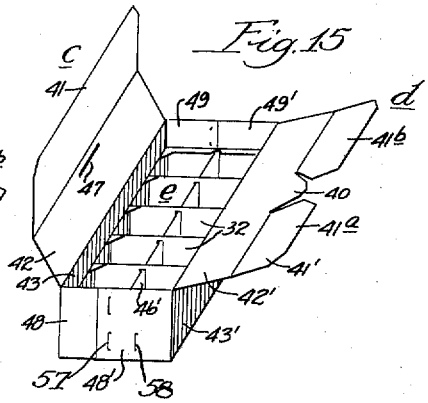
Figure 16:
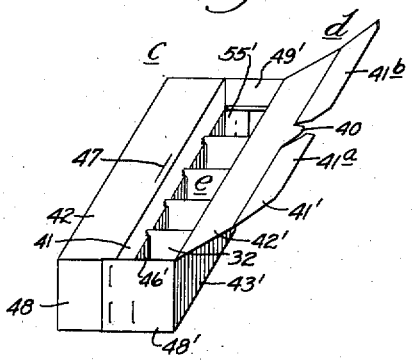
Figure 17:
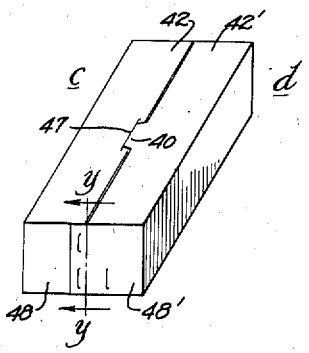
Figure 18:
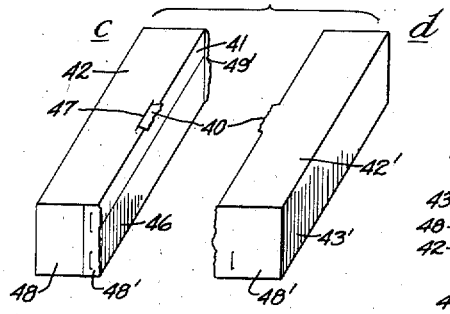
Figure 19:
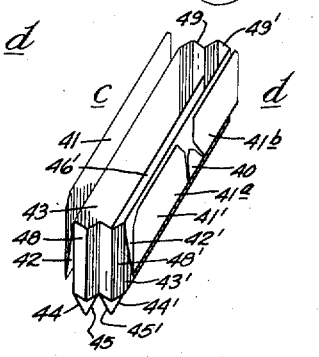

Fig. 6 which is an enlarged fragmentary view in perspective, shows the locking strip of one of the covers in secured position;

Fig. 7 is a view of the completed carton with both covers closed;

Fig. 8 is a view of the two carton components separated to provide separate and independent sections;

Fig. 9 is a view of the carton partly collapsed for shipment;

Fig. 10 is a diagrammatic sectional view taken in the plane of line 10—10 of Fig. 9;

Fig. 11 illustrates a modified form of blank in one piece from which may be produced two integral components of a twin-section carton;

Fig. 12 shows the carton partly erected;

Fig. 13 is a view of the blank from which may be formed a filler adapted for use with the carton of Fig. 12;

Fig. 14 is a view in perspective of the erected filler;

Fig. 15 shows the filler fitted within the completed carton;

Fig. 16 which is a view generally similar to Fig. 15 shows one of the carton covers in closed position;

Fig. 17 is a similar view with both carton covers closed and interfitted;

Fig. 18 illustrates the two sections produced by separation of the two carton components; and Fig. 19 is a view of carton partly collapsed for shipment.

Figure 1:
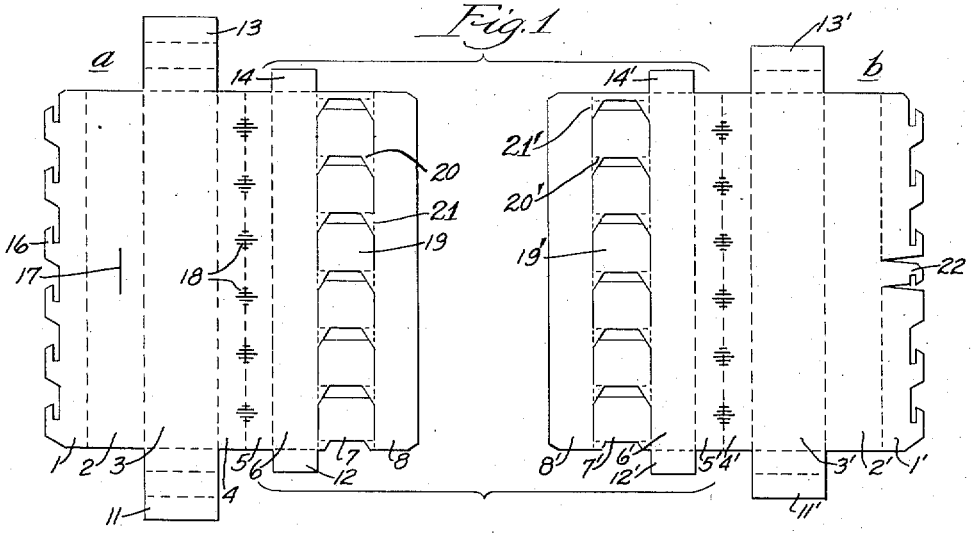
Figure 1 shows a two-piece blank from which the complete carton is made.

Referring now to Fig. 1, the carton is formed of two pieces of stiff paper, cardboard, pasteboard, or the like, the pieces being cut into the general shape shown in this figure. The complete carton is made up of two components *a* and *b*, each forming a complete unit. The dotted lines represent the lines along which the blank is folded. The blank part *a* is folded rather lightly along the line between two halves 4 and 5 of the bottom, and across the ends 11 and 13. These folds, however, may be omitted since they are used only when the box is collapsed for shipment. At 16 are shown tongues for locking the covers to their respective components. The blank is corrugated at the points 18 which are the points on the carton bottom whereon the eggs rest. This acts as a cushion support for the eggs.

Figure 2:
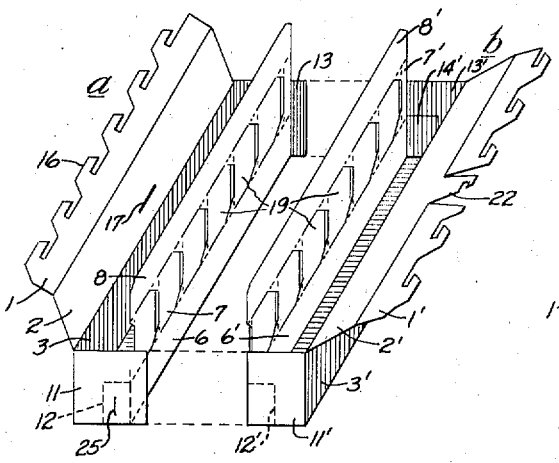
Fig. 2 is a view of the two carton components, each partly erected, prior to being fastened together.

Each blank part is folded along the scored lines to form the carton components shown in Fig. 2. The several portions of the blank defined by the scored lines, as shown in Fig. 1, are numbered 1 to 8 in the part *a*, and 1′ to 8′ in the part *b*, the same portions being given like reference numerals in the different figures. The portion 4—5 constitutes the bottom of one component of the cartoon. In the erected structure the end 11 and tab 12 are fastened together in any well known manner, as, for instance, by means of a wire clip 25. It is to be noted that the ends 11 and 13, on the blank part *a*, are longer than the corresponding ends 11′ and 13′ of the other blank part *b*, and that the former extend laterally beyond the inner longitudinal walls of the completed carton component, (see Figures 2 and 3) while the latter do not.

Figure 3:
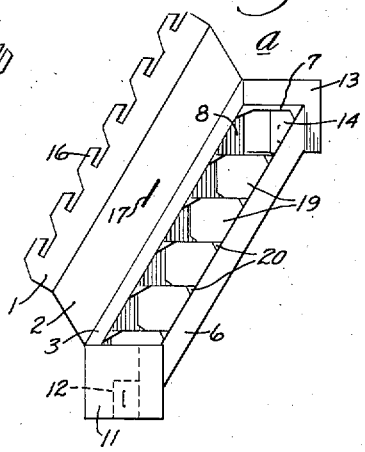
Fig. 3 is a view of one of the carton components completely erected.
Figure 4:
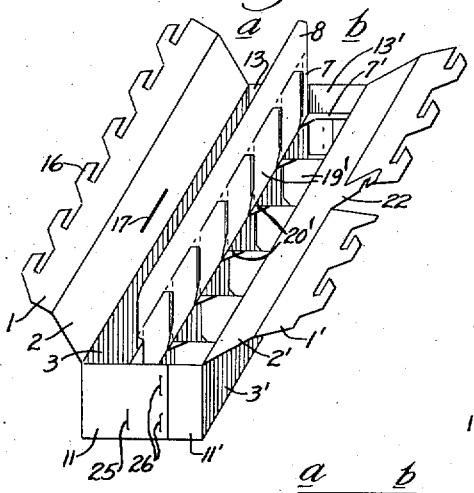
Fig. 4 is a view of the carton with its two components fastened together, the erection of one of the components being still incomplete.

The two carton components, when erected, are arranged one adjacent the other as shown in Fig. 4, and are then secured together by means of clips 26 similar to clips 25. The tranverse partitions 19 are formed from folded down pieces of the blank portions 7 and 7′ as shown in Figs. 3 and 4. In this connection attention is called to Figure 1 wherein the blank portions 7 and 7′ are cut as indicated by the several full lines, and are provided with fold lines 20—21, indicated by dotted lines, defining two sides of a series of triangular webs along which the paper is folded. The transverse partitions, such as 19, are folded at right angles to the plane of the paper, as seen in Fig. 1, along the scored lines 20. The entire blank portion 7 is folded along the scored lines which extend parallel with the line 21. The outside blank portion 8 which lies vertically against the carton side 3, acts as a support and stiffener for the several transverse partitions 19 as well as a reinforcement for the carton itself. The transverse partitions divide each component of the carton into a plurality of individual cells, each adapted to receive one egg.

In Fig. 4 the carton is shown with the transverse partitions of the component *b* folded into position. The corresponding partitions of the component *a* still await folding into place, as indicated in Fig. 3. When this is done, and the two components are fastened together, the carton is ready to receive its contents. After eggs have been placed into the cells, the carton is closed as shown in Figs. 5, 6 and 7.

Figure 5:
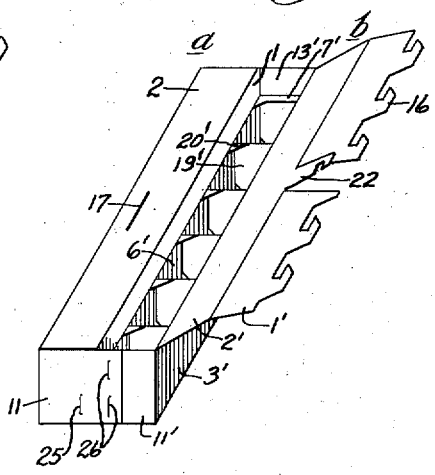
Fig. 5 is a view of the completed carton showing the covers of the two components in open and closed positions, respectively.

Referring to Fig. 5, the cover 2 is folded to form a closure for component *a* of the carton, and the locking strip 1 is then folded down to engage the triangular webs at the tops of the transverse partitions. The manner in which the lock is effected is illustrated in Fig. 6. The various parts are indicated by the reference characters previously used. The tongue 16 of the locking strip are hooked under the webs defined in part by the scored lines 20—21. These tongues are positioned under the webs by bending the locking strip downwards from the plane of the cover and inserting the same into the carton adjacent the wall 6 so that the tongues may spring beneath the webs. Upon release of the locking strip, the cover is held in place through engagement of the tongues with these webs.

The blank part *b* shown in Fig. 1 is provided with one tongue 22 which is not folded along with the locking strip so as to remain projecting beyond the free edge of the cover 2′. When the cover 2′ is closed down upon the carton, as is the cover 2 in Fig. 5, the tongue 22 is then inserted through a slit 17 in the opposite cover. This further holds together the two covers of the carton.

The carton, when closed, appears as shown in Fig. 7. A sticker or seal (not shown) may be placed across the two components at the slit 17 to seal the covers whereby to prevent an unscrupulous merchant from changing the eggs in the carton. Should a purchaser desire less than a dozen, say one-half dozen, the carton may be split in half by cutting the two ends 11 and 13 along a line such as X—X of Fig. 7. Under such conditions, the tongue 22 is, of course, also cut or torn. When the carton is separated into two sections, each is a complete unit which holds the eggs therein safely against breakage.

While I have here shown a carton made up of two components, it is, of course, apparent that the same may be made of any number of components. For instance, the carton may be made up of three components, the third component being similar to the component *a*. Also, while each component is shown as provided with cells for six eggs, any number of such cells may be provided without departing from the spirit of this invention.

Figs. 9 and 10 show the manner in which the empty carton may be collapsed for shipment. The blank portion 7′ of the section *b*, shown in Fig. 4, is opened as is the blank portion 7 of the section *a* shown in the same figure. The whole carton may then be collapsed in a manner which is obvious from Figs. 9 and 10, its various walls being indicated by the reference characters. It is, of course, understood that the carton is further collapsed until it is flat, the opposite walls then lying one upon the other.

Referring now to the carton shown in Figs. 11 to 19 inclusive, Fig. 11 indicates the general shape of the blank piece of paper, card board, pasteboard or the like from which the carton is made. The dotted lines indicates the scored lines along which the blank is folded. The blank is slitted at 47 to receive a tongue 40, and is further slitted at 51 for a purpose to be hereinafter more fully explained. It should, however, be noted at this point that the slit 51 does not extend entirely across the blank, but terminates a short distance from its opposite edges, so that the blank remains an integral piece. It should also be noted that the ends 48 and 49 are shorter than the ends 48′ and 49′. The portions into which one side *c* of the blank is divided by the several score lines have been numbered 41 to 46, and the corresponding portions on the opposite side *d* of the blank have been given similar reference numerals 41′ to 46′.

The score lines dividing into two halves the blank portions 44 and 45 and 44′ and 45′, are indented lightly in comparison to the other score lines. The same applies to the score lines across the ends 48 and 49 and 48′ and 49′. This is so made because the carton is folded along these lines only when it is collapsed for shipping purposes, while the other score lines are made use of in the actual erection of the carton. The two halves of the blank portions 44—45 and 44′ and 45′, which form the bottoms of the carton and upon which the eggs rest, are corrugated as indicated to act as a cushion in the same manner, as already described. The tabs 54—55 extend out from the longitudinal partition 46 an amount approximately equal to the width of the bottom 45, whereas the ends 48′ and 49′ extend out about three times as far. The reason for this will be apparent as the description proceeds.

Fig. 12 shows the carton in partially erected condition. The longitudinal partitions 46 and 46′ are folded back against each other, each to form one side of one of the carton components *c* and *d*. The slit 51 is at the ridge of the two partitions 46—46′, and as was previously stated it does not extend the entire distance lengthwise of the carton. The blank portions 43 and 43′ form the two opposite side walls of the carton, while the portions 48 and 49 form the ends of the carton component *c*, and the portions 48′ and 49′ form the ends of the other component *d*. The blank portions 42 and 42′ form covers for the component *c* and *d*, respectively. The tab 55 which is integral with the partition 46 overlaps the end 49 which is integral with the side 43. The tab 55 extends only half way across the end 49. The end 49′ folds on the outside of the carton and also overlaps about half of the end 49. The same is, of course, also true of the opposite end of the carton in which the end wall 48′, overlaps the end 49 and tabs 54—54′. A clip or wire 57 is then passed through the ends 48 and 48′ and tab 54, and another fastener 58 is passed through the ends 48′ and tab 54′. Similar fasteners are also secured on the opposite end of the carton. The carton then presents the appearance shown in Fig. 15 without the filler.

An explanation of the constructions and use of the filler shown in Figs. 13 and 14 will now be given. The filler *e* is made of pasteboard of suitable thickness, the form of the blank being as shown in Fig. 13. In that figure the full lines indicate the portion of the filler that has been cut away and the dotted lines indicate the lines along which the filler is scored for folding. The fillers are shipped flat as shown in Fig. 13, and are folded into the form shown in Fig. 14, when they are to be used. The sides 30—31 are folded down at right angles to the plane of the paper, along the scored lines 33, from the position of Fig. 13 to that shown in Fig. 14. The cross partitions 32 are likewise folded downwardly along the scored lines 34. The triangular webs defined in part by the fold lines 33 and 34 connect the cross partitions integrally with the sides 30 and 31. These cross partitions are each provided with a slot 38 extending inwardly from their lower edges, as viewed in the erected position of Fig. 11, the slots continuing to a point close to the top edges of the partitions where narrow bridges 37 remain.

The filler is adapted to be fitted in the carton, as shown in Fig. 15. When so placed, the longitudinal partitions 46—46′ of the carton are received within the slots 38 of the cross partitions of the filler, the bridges 37 crossing over the ridge of the longitudinal partitions, as shown. The lower edges of the filler sides are rested on the bottom of the carton. In this manner cells are provided, each for the accommodation of a single egg.

After filling the carton, its covers may be closed down, as indicated in Figs. 16 and 17. Although in Fig. 16 the carton is only partially closed, no contained eggs are shown, so as to facilitate illustrating the invention. When the cover 42 is folded over to close the top of the carton component *c*, the locking strip 41 is folded down to lie on the left-hand side of the partition 46, as seen in Fig. 16. When an attempt is made to force the locking strip beyond the top of this partition, the filler shown in Figs. 14 and 15 acts as an obstruction. However, it is to be noted that the obstructing portions of the filler are confined to the bridges 37 which are very narrow and quite weak. If, therefore, a little force is applied to push down the locking strip 41, it forces its way through, breaking the several bridges and thereby tearing the filler into two parts. The locking strip 41′ of the blank component *d* is divided into two flaps $41^a$ and $41^b$ on opposite sides of a central tongue 40. These flaps may be folded down to lie on the right-hand side of the longitudinal partitions 46′, as seen in Figs. 15 and 16. The tongue 40 is then insertable through the slit 47 by which to hold the cover 42′ in closed position. The carton may then be sealed by placing a seal between the two covers.

Should a customer want only six eggs, the retailer may divide the carton into two sections by cutting the opposite ends 48′—49′ of the components *c* and *d* of the carton along a line Y—Y. The object of the slit 51 is now apparent. If the slit were omitted, it would be necessary in dividing the carton to cut along the entire ridge between the two longitudinal partitions 46—46′ with a knife or the like, whereas, with a preformed slit extending part of the distance, the rest may be torn apart, or if a cutting tool is to be used, the slit reduces the amount of material to be cut. By this severance, two separate sections *c* and *d* are produced, as shown in Fig. 18, each containing the desired number of eggs. The covers of the two sections, when separated, will not tend to open particularly if the eggs in the cells are of such size as to exert pressure against the locking strips 41—41′ which are fitted within the carton, against the partitions 46—46′.

An explanation will now be given of the manner in which the empty cartons are shipped from the factory to the retailer. The filler and the blank are shipped separately, the filler preferably flat as shown in Fig. 13. The carton is completely erected, as shown in Fig. 15 (with the filler removed) and is then folded as shown in Fig. 19, the folding being along the scored lines between the two halves 44—45 and 44′—45′ of the bottoms, and along the scored lines across the ends 48, 49, 48′ and 49′ of Fig. 11. In so doing, the opposite ends of each component of the carton, as seen in Fig. 15, are folded downwardly, and the bottom portion of each carton component is folded either upwardly or downwardly. Fig. 19 shows the carton partially collapsed. It is apparent from that figure that the carton is further collapsed until it is flat, the opposite walls then lying one upon the other.

In compliance with the requirements of the patent statutes, I have herein described certain preferred embodiments of my invention. It is, however, to be understood that the same are shown for illustrative purposes only, and I do not wish to be limited to the precise constructions shown.

What I consider new and desire to secure by Letters Patent is

1. An egg carton having two components, each complete in itself, the opposite ends of the two components being joined together, said two components being severable into two carton sections each complete in itself by a severing of the carton at the opposite ends thereof where the two components are joined.

2. A collapsible carton having sides and ends, two bottoms side by side of equal width, a partition wall formed of two pieces of material dividing the carton longitudinally into two equal components, one of said pieces being integral with one bottom and the other with the other bottom, each end of the carton consisting of a unitary piece of material extending on both sides of the partition wall, said caron being collapsible by folding each bottom longitudinally thereof and folding the ends thereby bringing the opposite sides of the carton into juxtaposition with the partition wall, said carton being divisible into two sections, each complete in itself, by cutting each end in two between the two pieces constituting the partition wall.

3. A paper carton consisting of two individually complete components, said carton having a cover, a bottom, and four vertical walls, the vertical walls of the carton being joined to form a continuous band, said carton being severable into two sections by severing the band along vertical lines at the center of two opposite vertical walls.

4. In combination, two paper carton components each a complete unit having a cover, a bottom, two ends and two sides, means for securing the ends of the two components together to form one combined carton, said combined carton being severable into two sections each complete in itself by tearing the portion connecting the ends.

5. A paper carton consisting of two individually complete components, each formed of an integral piece of paper, and each component having a cover, a bottom, two sides and two ends, a portion of the ends of one of the components overlapping the ends of the other component, fastening means securing the overlapping ends together, whereby the two components are joined, the two components being severable as complete units into sections by tearing the overlapping portions of the ends.

6. A paper carton formed of two individually complete and substantially similar components placed in alignment, each component being formed of an integral piece of paper, and each component having a cover, a bottom, and four sides, a part of certain of the opposite aligned walls of the components overlapping, fastening means securing the overlapping sides together whereby the two components are joined, the two components being severable into sections, each complete in itself, by tearing the overlapping portions.

7. A paper carton having four vertical walls, two covers side by side, and two bottoms side by side, the carton being divided into two components by means of two back to back vertical walls, each formed by folding the bottoms upwardly along their abutting edges, both of the dividing walls being joined to two opposite walls of the carton on opposite sides of the center line of those walls, the carton being divisible into two sections, each complete in itself, by tearing the last mentioned opposite walls along their center line.

8. In combination, two paper carton components, each a complete unit having a bottom, two opposite vertical walls, a cover integral with one of the vertical walls, and means on the cover for locking the cover to the opposite vertical wall, and means for securing one of the vertical walls of one of the components to one of the vertical walls of the other carton component only at points adjacent the ends of those walls whereby a two-component carton severable into two sections is produced.

9. A paper carton having two longitudinal walls, two covers arranged side by side and two bottoms similarly arranged, the carton being divided into two components by means of two back to back vertical walls, each formed by folding the bottoms upwardly along their abutting edges, both of the dividing walls being joined together at two points at opposite ends of the carton and being unconnected with one other between said points, said carton being severable into two sections, each complete in itself, by severing the two walls from each other.

10. A paper carton having two longitudinal walls, two covers arranged side by side and two bottoms arranged similarly, the carton being divided into two components by means of two back to back vertical walls each formed by folding the bottoms upwardly along their abutting edges, both of the vertical dividing walls being joined together at two points at opposite ends of the carton and being unconnected with one another between said points, the top of each dividing wall being folded, and transverse partitions struck from the folded parts for dividing the carton into a plurality of cells, said carton being severable into two sections, each complete in itself, by severing said two vertical walls from each other.

11. In combination, two similar complete egg carton components, each including a cover, a bottom, and longitudinal walls secured together, one of the longitudinal walls of one of the carton components being secured to a longitudinal wall of the other component whereby a combined carton severable into sections, each complete in itself, is produced, said last two mentioned longitudinal walls being joined at two of their respective ends and being unconnected with one another between said ends.

12. In combination, two paper carton components, each a complete unit having a cover, a bottom, and longitudinal sides, one of the longitudinal sides of one of the carton components being secured to a longitudinal side of the other carton component only adjacent their ends to form one combined carton, said combined carton being severable into two sections, each complete in itself, by severing the two longitudinal sides from each other.

13. In combination, two paper carton components, each a complete unit having a cover, a bottom and longitudinal sides, one of the longitudinal sides of one of the carton components being secured only at two of its opposite ends to the ends of a longitudinal side of the other carton component to form one combined carton, said combined carton being severable into two sections each complete in itself.

14. A paper carton consisting of two individually complete components, said carton having a cover, a bottom and four vertical walls, one wall of one component being connected integrally to an adjacent wall of the other component, certain of the vertical walls of the carton being joined to form a continuous band, said carton being severable into two sections, each complete in itself, by severing (1) the band along vertical lines at the center of two opposite vertical walls and (2) the integral connection between the two adjacent walls.

15. A carton paper consisting of two individually complete components, said carton having a cover, a bottom, and four vertical walls, the vertical walls of the carton being joined to form a continuous band, said carton being severable into two sections, each complete in itself, by severing the band along vertical lines at the center of two opposite vertical walls, the adjacent sides of the two sections comprising a single sheet of paper folded to form the two sides and weakened to facilitate severing of the carton into two sections.

16. In combination, two similar complete egg carton components each including a cover, a bottom, and longitudinal walls secured together, one of the longitudinal walls of one of the carton components being secured to a longitudinal wall of the other carton component whereby a combined carton severable into two sections, each complete in itself, is produced, said last two mentioned longitudinal walls being joined at two of their respective ends and being unconnected with one another between said ends, and constituting a single sheet of paper slitted intermediate their ends.

17. In combination, two paper carton components formed of a single sheet of paper and each a complete unit having a cover, a bottom, and longitudinal sides, one of the sides of one of the carton components being secured only at two of its opposite ends to the corresponding ends of a side of the other carton component to form one combined carton, the paper of said two longitudinal sides being continuous at certain points of juncture of said sides, said combined carton being severable into two sections each corresponding to one of the components thereof.

18. As an article of manufacture, a carton made from a paper blank which extends for the length of the carton in one direction and is foldable along preformed bend lines extending in the same direction to provide certain upstanding longitudinal walls, in combination with certain other upstanding transverse walls connected to the longitudinal walls to form therewith a series of cells in plural rows of unequal length arranged transversely of each other, the several cells in the longer rows being separated each by a single wall and the number of walls being one in excess of the number of cells in such rows and two in excess of the number of cells in the shorter rows, and means forming a prearranged line of severance longitudinally of the carton and along two upstanding cell-forming walls defining a plane of separation for the carton into two cellular sections, each complete in itself, the two carton sections prior to separation being united immovably relative to each other.

19. As an article of manufacture, a carton made from a paper blank which extends for the length of the carton in one direction and is foldable along preformed bend lines extending in the same direction to provide certain upstanding longitudinal walls and a cover, in combination with certain other upstanding transverse walls connected to the longitudinal walls to form therewith a series of cells in plural rows of unequal length arranged transversely of each other, the several cells in the longer rows being separated each by a single wall and the number of walls being one in excess of the number of cells in such rows and two in excess of the number of cells in the shorter rows, means on the walls with which the cover may engage when in closed position over the cells, and means forming a prearranged line of severance longitudinally of the carton and along two upstanding cell forming walls defining a plane of separation for the carton into two cellular sections each complete in itself, the two carton sections prior to separation being united immovably relative to each other.

20. As an article of manufacture, a one-piece carton made from a paper blank which extends for the length of the carton in one direction and is foldable along preformed bend lines extending in the same direction to provide certain upstanding longitudinal walls and a cover, in combination with certain other upstanding transverse walls integrally joined to the longitudinal walls to form therewith a series of cells in plural rows of unequal length arranged transversely of each other, the several cells in the longer rows being separated each by a single wall and the number of walls being one in excess of the number of cells in such rows and two in excess of the number of cells in the shorter rows, means on the walls with which the cover may engage when in closed position over the cells, and means forming a prearranged line of severance longitudinally of the carton and along two upstanding cell-forming walls defining a plane of separation for the carton into two cellular sections each complete in itself, the two carton sections prior to separation being united immovably relative to each other.

21. As an article of manufacture, a carton made from a paper blank erected into a rigid structure in which is comprised upstanding walls defining cells arranged in two rows of six cells each, the several cells in the longer rows being separated each by a single wall and the number of walls being two in excess of the number of cells in the shorter rows, and means forming a prearranged line of severance longitudinally of the carton along the two upstanding walls of the longer rows of cells defining a plane of separation for the carton into two cellular sections, each complete in itself, the two carton sections prior to separation being united immovably relative to each other.

LOUIS SUGERMAN.